United States Patent [19]

Morris et al.

[11] Patent Number: 4,537,286

[45] Date of Patent: Aug. 27, 1985

[54] ELEVATOR SYSTEM

[75] Inventors: Arnold M. Morris, West Caldwell; Jitendra K. Trivedi, West Milford, both of N.J.

[73] Assignee: Westinghouse Electric Corp., Pittsburgh, Pa.

[21] Appl. No.: 540,069

[22] Filed: Oct. 7, 1983

[51] Int. Cl.³ .................................................. B66B 9/00
[52] U.S. Cl. ......................................... 187/1 A; 403/201
[58] Field of Search .................... 187/1 A, 20, 23, 26, 187/94; 403/201; 256/39, 37

[56] References Cited

U.S. PATENT DOCUMENTS

| | | | |
|---|---|---|---|
| 1,472,386 | 10/1923 | Cook | 187/1 A |
| 1,700,587 | 1/1929 | Higbee | 187/1 A |
| 1,891,115 | 12/1932 | Scott | 187/1 A |
| 1,963,706 | 6/1934 | Neve | 187/1 A |

FOREIGN PATENT DOCUMENTS 1000216 11/1976 Canada ................................. 187/20

Primary Examiner—Joseph J. Rolla
Assistant Examiner—Kenneth Noland
Attorney, Agent, or Firm—Donald R. Lackey

[57] ABSTRACT

A traction elevator system including elevator ropes, and hitch plates for terminating the elevator ropes. At least one of the hitch plates includes first and second vertically spaced, aligned support levels, with the rope terminations defining first and second complementary patterns, respectively, selected to reduce the maximum fleet angle by providing components thereof in the axial direction, with respect to the sheave axis, and transverse thereto, and by reducing the cross-sectional area occupied by the ropes at the hitch plate.

8 Claims, 7 Drawing Figures

ELEVATOR SYSTEM

BACKGROUND OF THE INVENTION

1. Field of the Invention

The invention relates in general to traction elevator systems, and more specifically to arrangements for terminating the ropes of such systems.

2. Description of the Prior Art

In traction elevator systems in which one or both of the movable components are roped 2:1, the ropes which extend from the sheave carried by the 2:1 roped movable element are terminated in the overhead via a dead-end hitch plate. It is desirable to use a large plurality of relatively small diameter elevator wire ropes with the full or double wrap traction drive arrangement usually used with multiple roping arrangements, because they accommodate the 180° bends better than a smaller number of larger diameter ropes. However, the more ropes that are used, the larger the fleet angle. This is due to the fact that each rope is terminated at the dead-end hitch plate in an adjustable shackle arrangement which includes compression springs disposed about a shackle rod. The rope terminations are thus more widely spaced than the rope grooves in the 2:1 sheave carried by the movable element. The fleet angle changes as the movable element travels between its travel limits, flexing and thus causing fatigue of each rope at the rope-socket interface, especially in the shackle arrangements of unit construction which include the rope socket as an integral, fixed part thereof. The changing fleet angle, which is in the axial direction, taken with respect to the axis of the 2:1 sheave, also causes groove erosion or wear and rope wear, as the rope axis is not aligned with the groove axis.

SUMMARY OF THE INVENTION

Briefly, the present invention reduces the maximum fleet angle of elevator ropes by providing upper and lower, vertically aligned support levels in a hitch plate, with each rope being terminated at a selected level. The rope terminations are disposed at each level in predetermined complementary patterns selected to reduce the maximum fleet angle in the direction of the sheave axis by reducing the cross-sectional area occupied by the ropes at the hitch plate and by providing rope angles, for at least some of the ropes, which have components in a direction transverse to the axial direction, as well as in the axial direction. This transverse component is also maintained within the reduced maximum axial value, to maintain the desired reduction in the amount of flexing of each of the elevator ropes at its socket. The transverse component adds very little to the erosion of the groove edges, as it is in the direction which merely changes the angle of wrap. While the hitch plate of the invention is especially suitable for dead-end hitch plates in 2:1 roping applications, it may also be used as the car and/or counterweight hitch plates in 1:1 ropings.

BRIEF DESCRIPTION OF THE DRAWINGS

The invention may be better understood, and further advantages and uses thereof more readily apparent, when considered in view of the the following detailed description of exemplary embodiments, taken with the accompanying drawings in which.

DESCRIPTION OF PREFERRED EMBODIMENTS

Figure 1:
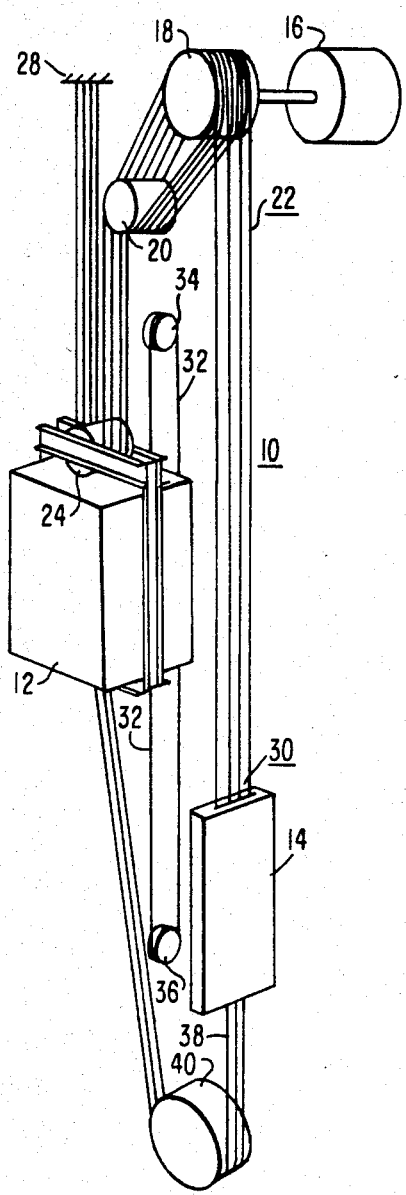
FIG. 1 is a perspective view of a traction elevator system in which both movable components are roped 2:1.

Referring now to the drawings, and to FIG. 1 in particular, there is shown a traction elevator system 10 of the type which may advantageously utilize the teachings of the invention. Traction elevator system 10 includes two major movable components or elements, an elevator car 12 and a counterweight 14, which are mounted in the hoistway of a building for guided vertical movement between predetermined travel limits. A traction drive machine 16, which may include an AC or a DC drive motor, is disposed to drive the elevator car 12 and its counterweight 14 via a sheave and rope arrangement which includes a traction or drive sheave 18, a secondary sheave 20, and a plurality of wire elevator ropes shown generally at 22. For purposes of example, the elevator car 12 is roped 2:1 and its counterweight 14 is illustrated with 1:1 roping. When an element or component of an elevator system is multiple roped, instead of the ropes terminating at the element, the element carries a sheave, which will be hereinafter referred to as the 2:1 sheave, and the ropes are terminated at a dead-end hitch plate in the overhead above the hoistway. When a component is roped 1:1, the ropes terminate at the component secured by a suitable hitch plate. Thus, elevator car 12 carries a 2:1 sheave 24. The ropes 22 extend from a dead-end hitch 28 to sheave 24 on the elevator car 12, and they then extend to the drive-secondary sheave arrangement, traversing these sheaves with the full or double wrap illustrated, or with a half or single wrap, as desired. The ropes 22 then extend to the counterweight 14, and they terminate in a hitch 30. A governor rope 32, reeved about governor and idler sheaves 34 and 36, respectively, is connected to the elevator car 12, and compensation ropes 38 interconnect the bottoms of the elevator car 12 and counterweight 14 via a compensator sheave 40 located in the pit. Each of the hitch plate arrangements 28 and 30 may be constructed according to the teachings of the invention.

Figure 2:
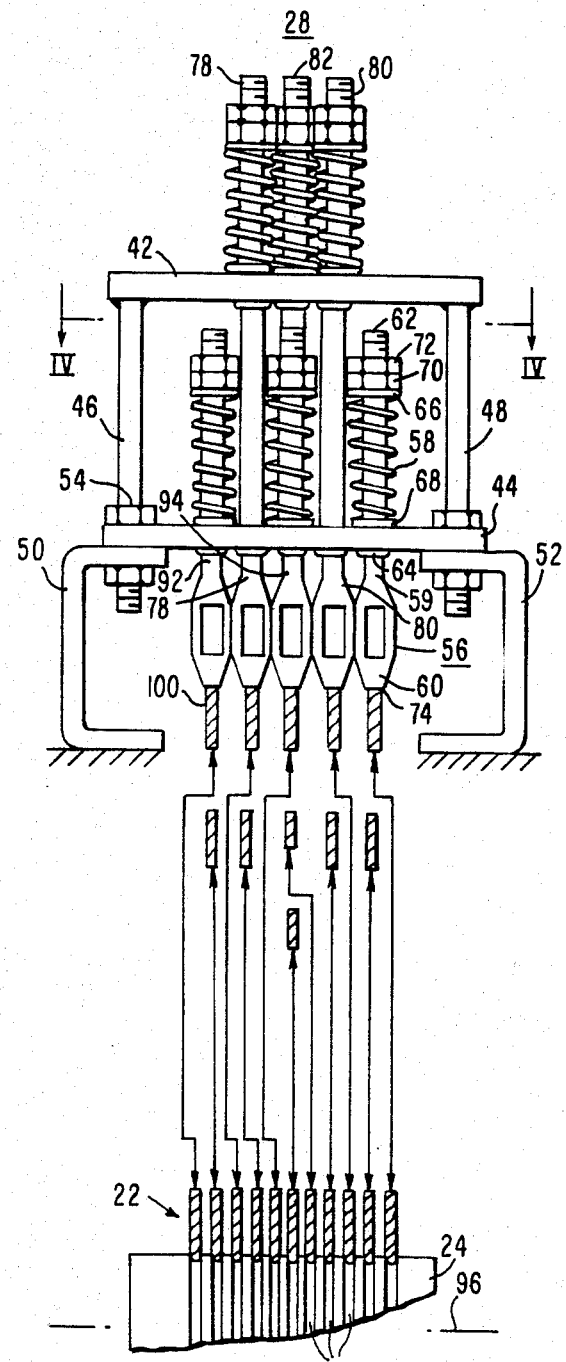
FIG. 2 is an elevational view of a bi-level dead-end hitch plate constructed according to the teachings of the invention.

FIG. 2 is an elevational view of the dead-end hitch plate 28, constructed according to the teachings of the invention, in which upper and lower support levels are provided by upper and lower metallic plate members 42 and 44, respectively. Plate members 42 and 44 are spaced in vertical alignment via first and second horizontally spaced, vertically oriented metallic plate members 46 and 48, respectively, or by any other suitable structural spacing means. Plate members 46 and 48 may be welded to the horizontally oriented plate members 42 and 44. The lower plate member 44 is secured to and mounted on the top of overhead beams, machine beams, or on top of auxiliary beams connected to the webs of overhead beams, either directly, or via hitch plate blocking beams or channel members 50 and 52. The lower support plate may be secured to the blocking beams by welding or bolting, such as by a plurality of bolts 54.

Figure 7:
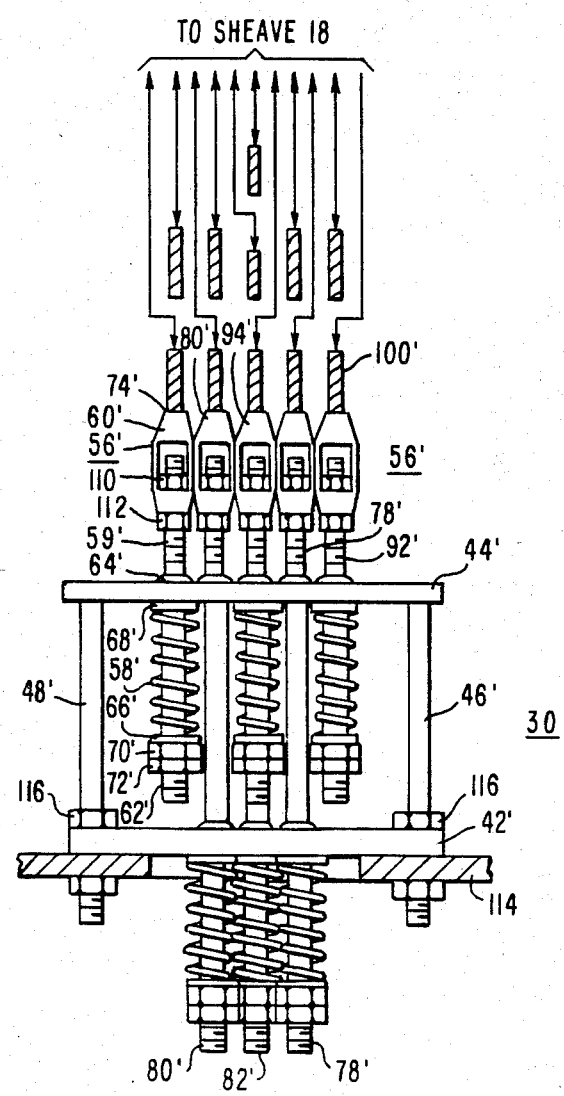
FIG. 7 is an elevational view of a counterweight hitch plate constructed according to the teachings of the invention.

Each of the ropes 22 is terminated at a selected support plate member via an adjustable shackle arrangement which may include a metallic rope socket and shackle rod of the unit construction shown in FIG. 2, such as combination rod and socket 56 associated with the lower support level, and a shackle spring 58. The rope socket and shackle rod may be of separate construction, such as shown in FIG. 7. Shackle rod and socket combination 56 includes a rod member 59 having a rope socket 60 disposed at one end, and threads 62 at its other end, with the threads extending for a predetermined dimension. The threaded end of shackle rod 59 is inserted upwardly through an opening in the lower support plate member 44, which preferably includes a guide bushing 64 constructed of a suitable low friction, wear resistant material, such as the material sold under the trade name Delrin. The shackle spring 58, complete with upper and lower spring collars 66 and 68, is telescoped over the threaded end of rod 59, and nuts 70 and 72 are disposed on the threaded end to adjust the associated rope to the desired length by compressing spring 58. A cotter pin (not shown) is disposed through an opening in rod 59 disposed above nut 72, to prevent accidental disengagement between the nuts 70 and 72 and the shackle rod 59.

Each rope termination arrangement on the upper level provided by plate member 42 is similar to that just described relative to the rope terminations on the lower level, except a longer shackle rod is used, and each shackle rod extends through suitably bushed openings in both the upper and lower support plate members 42 and 44, respectively.

The rope terminating arrangements are disposed in predetermined different but complementary geometrical patterns on the two support levels, with the patterns being selected to reduce the cross-sectional area occupied by the ropes adjacent to their terminations, which reduces the maximum amount of rope flexing, and also the rope fatigue which occurs at the rope-socket interface 74 of each of the ropes. For purposes of example, eleven elevator ropes are illustrated in FIG. 2, with the rope terminations being divided as equally as possible between the two support levels. For example, the upper level may have five rope terminations, and the lower level six rope terminations. The geometrical patterns preferably are on common centers, and when an odd number of ropes are used, such as eleven, a rope termination on one of the levels is preferably located at the common geometrical center. With eleven ropes, in addition to the rope termination at the geometrical center at one of the support levels, the remaining rope terminations preferably are disposed in rectangular configurations, with the long dimension of the two rectangular configurations being disposed transverse to one another.

Figure 3:
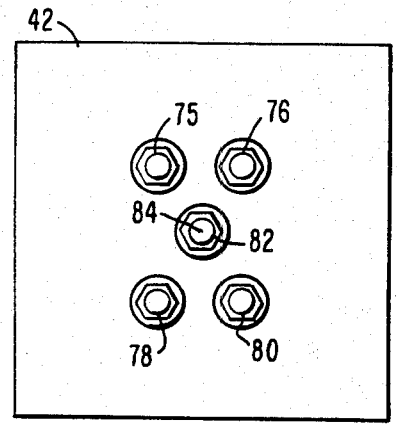
FIG. 3 is a plan view of the upper rope support level of the hitch plate shown in FIG. 2.

More specifically, the predetermined configuration of rope terminations on the uppermost level, as shown in the plan view of this level in FIG. 3, preferably includes rope terminations having shackle rods 75, 76, 78 and 80 disposed at the four corners of a rectangular configuration whose longest dimension is in the direction between shackle rods 75 and 78. This configuration also has a rope termination having a shackle rod 82 located at the geometrical center 84 of the rectangular configuration.

Figure 4:
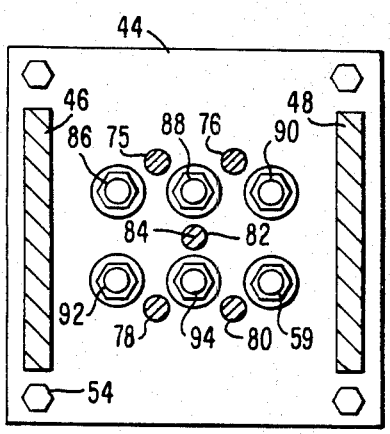
FIG. 4 is a cross-sectional view of the lower rope support level of the hitch plate shown in FIG. 2, taken between and in the direction of arrows IV—IV.

The predetermined configuration of rope terminations on the lower level, as shown in FIG. 4, which is a cross-sectional view of the hitch plate 28 taken between and in the direction of arrows IV—IV in FIG. 2, includes, in addition to shackle rod 59 of rope termination 56 previously described, five additional rope terminations having shackle rods 86, 88, 90, 92 and 94. Shackle rods 86, 90, 92 and 59 are disposed at the four outer corners of a rectangular configuration which has its longest dimension between shackle rods 86 and 90. Shackle rod 88 is disposed at the midpoint of the side of the rectangle which includes shackle rods 86 and 90, and shackle rod 94 is disposed at the midpoint of the side of the rectangle which includes shackle rods 92 and 59. These complementary configurations result in the most compact arrangement of rope terminations, without any interference between the rope terminations of the two levels, for an eleven rope arrangement. The longer length dimension of the two different complementary rectangular configurations, which in the preferred embodiment is the rectangular configuration on the lower level, is oriented parallel with the axis 96 of the associated 2:1 sheave 24, in order to place as many rope terminations as possible in the direction of the rope grooves 98, without exceeding the desired maximum fleet angle.

Figure 5:
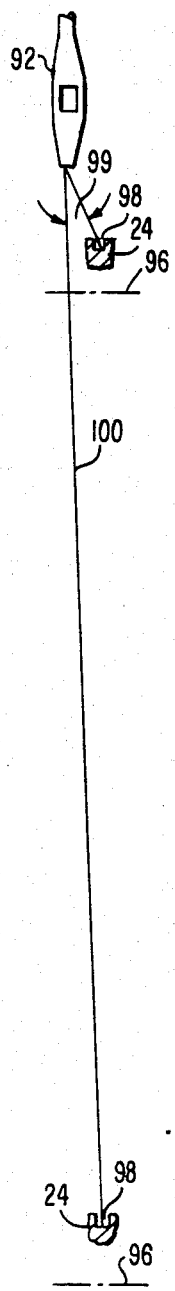
FIG. 5 illustrates the angle of flexing or fleet angle of one of the ropes in the axial direction of the 2:1 sheave.
Figure 6:
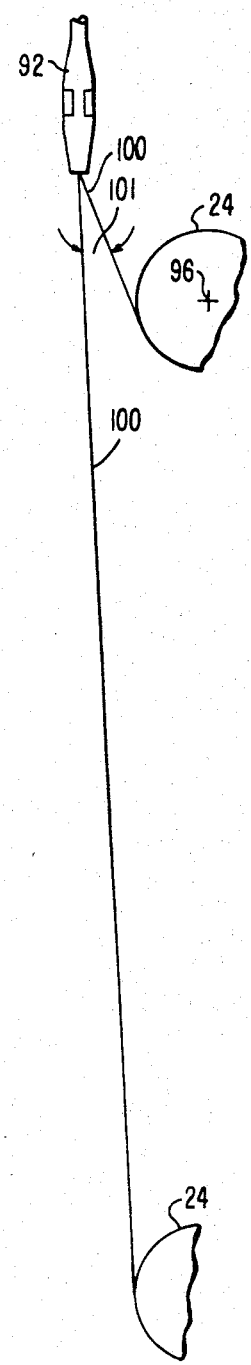
FIG. 6 illustrates the angle of flexing of one of the ropes in a direction transverse to the axial direction shown in FIG. 5.

FIG. 5 illustrates the maximum angle 99 of flex of rope 100 as sheave 24 moves between its travel limits, with angle 99 being the component of the actual rope angle which lies in a plane which includes the sheave axis 96. The maximum value of angle 99 has been reduced due to the fact that a component 101 of the actual rope angle has been added, with angle 101 being shown in FIG. 6. Angle 101 is located in a plane transverse or 90° to the sheave axis 96. Both components 99 and 101 of the actual rope angle, as well as the actual rope angle itself, are held within the desired maximum value.

FIG. 7 is an elevational view of the counterweight hitch plate 30 constructed according to the teachings of the invention. Except for being upside down, compared with the dead-end hitch plate 28, it is substantially the same as the dead-end hitch plate 28, and like elements are given like reference numerals, except for the addition of a prime mark. Shackle rod and rope sockets of the unit construction may be used, as shown in FIG. 2, or the separate construction shown in FIG. 7 may be used. In the separate construction, shackle rod 59' is threaded at both ends and rope socket 60' has an opening for receiving a threaded end. Nuts 110 and 112 secure the rod 59' to the socket 60'. In this embodiment, the hitch plate 30 is secured to the counterweight frame 114, such as via a plurality of bolts 116. The hitch plate arrangement of the invention would be especially useful for a counterweight termination when space between the hitch wall and/or car and the counterweight frame must be within a specified dimension.

The fleet angle on a prior art elevator rope hitch plate for terminating eleven ropes reaches a maximum of over $3\frac{1}{2}°$. In the bi- or dual level hitch plate of the present invention, the spacing of the shackles, which is restricted by the shackle spring spacing, results in the same maximum fleet angle as a prior art 7-rope dead-end hitch plate, which is about 1½°. Thus, in an elevator system constructed according to the present invention, rope fatigue at the rope-socket interface is substantially reduced, greatly extending rope life, and groove erosion is also reduced.

We claim as our invention:

1. A traction elevator system, comprising:

first and second movable components including an elevator car and a counterweight each mounted for guided, vertical movement between predetermined travel limits, drive means for said first and second movable components, including first and second hitch plate means associated with said first and second movable components, respectively, for terminating the plurality of ropes, at least one of said first and second hitch plate means including upper and lower, vertically spaced support plate members and rope termination means distributed substantially equally between said support plate members to reduce the maximum fleet angle as the associated movable component travels between its limits, said upper and lower plate members each having horizontally oriented, major, flat surfaces, said upper plate member being disposed directly above the lower, with their facing flat surfaces being in parallel planes, said upper and lower plate members being rigidly spaced to provide a fixed dimension between them, each of said rope termination means including a rope socket, a shackle rod connected to each rope socket, and a shackle spring disposed about each shackle rod, with the shackle spring being a compression spring, co-acting with a flat major surface of a support plate member, each of said first and second plate members cooperating with predetermined rope termination means to provide two spaced rope termination levels, with the shackle rods of a predetermined termination level proceeding through openings disposed in the plate member associated with the other termination level, the ropes of the two termination levels being disposed such that the shackle rods are interleaved on one of the levels with a predetermined pattern in which a rod from one level is closer to a rod from the other level than it is to another rod from its same termination level.

2. The traction elevator system of claim 1 wherein the openings in the support plate members include low friction guide bushings.

3. The traction elevator system of claim 1 wherein each support plate member includes openings having low friction guide bushings through which the shackle rods extend.

4. The traction elevator system of claim 1 wherein the rope termination means associated with the upper and lower support plate members are arranged in first and second different complementary patterns each having a plurality of rows, with the patterns being selected to reduce the fleet angle by reducing the cross-sectional area occupied by the ropes at the hitch plate means, and by distributing at least certain of the rope angles both axially, with reference to the axis of the sheave on the at least one movable component, and in a direction transverse to said axis.

5. The traction elevator system of claim 4 wherein each pattern or rope terminations defines a rectangular configuration aligned on common geometrical centers, but with their longest sides being transverse to one another.

6. The traction elevator system of claim 5 wherein one of the rectangular configurations additionally includes a rope termination disposed at the common geometrical center.

7. The traction elevator system of claim 1 wherein the means for roping the movable components ropes at least one of them 2:1, including a sheave on said at least one movable component and a dead-end hitch plate, with the at least one hitch plate means being said dead-end hitch plate.

8. The traction elevator system of claim 1 wherein the means for roping the movable components ropes at least one of them 1:1, including a hitch plate on said at least one movable component, with the hitch plate means being the hitch plate on said at least one movable component.

* * * * *